(12) United States Patent
Liu

(10) Patent No.: US 9,348,439 B2
(45) Date of Patent: May 24, 2016

(54) TOUCH SENSITIVE DISPLAY AND MANUFACTURING METHOD THEREOF

(75) Inventor: Chen-Yu Liu, Jhongli (TW)

(73) Assignee: TPK Touch Solutions Inc., Taipei (TW)

( * ) Notice: Subject to any disclaimer, the term of this patent is extended or adjusted under 35 U.S.C. 154(b) by 153 days.

(21) Appl. No.: 13/220,699

(22) Filed: Aug. 30, 2011

(65) Prior Publication Data

US 2012/0319961 A1    Dec. 20, 2012

(30) Foreign Application Priority Data

Jun. 15, 2011    (CN) .......................... 2011 1 0160546

(51) Int. Cl.
  *G06F 3/041*    (2006.01)
(52) U.S. Cl.
  CPC .............. *G06F 3/041* (2013.01); *G06F 3/0412* (2013.01); *Y10T 29/49002* (2015.01)
(58) Field of Classification Search
  USPC ................................................. 345/173, 174
  See application file for complete search history.

(56) References Cited

U.S. PATENT DOCUMENTS

| 8,552,989 | B2* | 10/2013 | Hotelling et al. | ............. | 345/173 |
| 2007/0242055 | A1* | 10/2007 | Lai | ................. | 345/173 |
| 2009/0009465 | A1* | 1/2009 | Choi et al. | .................... | 345/107 |
| 2010/0110041 | A1* | 5/2010 | Jang | ...................... | G06F 3/0412 |
| | | | | | 345/174 |
| 2011/0043464 | A1* | 2/2011 | Lee | .......................... | G06F 3/042 |
| | | | | | 345/173 |
| 2012/0162584 | A1* | 6/2012 | Chang | ................... | G06F 3/0412 |
| | | | | | 349/106 |

FOREIGN PATENT DOCUMENTS

| CN | 101635276 | 1/2010 |
| CN | 101894856 | 11/2010 |

* cited by examiner

*Primary Examiner* — Gerald Johnson
*Assistant Examiner* — Robert Michaud
(74) *Attorney, Agent, or Firm* — Gokalp Bayramoglu

(57) ABSTRACT

The present invention relates to a touch sensitive display, which comprises a merged layer made of sensing electrodes and organic light-emitting electrodes. The touch sensitive display further comprises a first touch sensing layer and an organic light-emitting assembly, wherein the first touch sensing layer has a plurality of first sensing electrodes, which are formed onto a surface of an upper substrate. This organic light-emitting assembly is disposed on an upper surface of a lower substrate, and the merged layer is formed on the surface of the organic light-emitting assembly. The sensing electrodes that comprised in this merged layer are second sensing electrodes, while the organic light-emitting electrodes are counter electrodes which originally belong to the organic light-emitting assembly. In addition, the present invention also provides a manufacturing method of a touch sensitive display. Thereby, the present invention could reduce the manufacturing procedure and efficiently increase the yield rate of production.

20 Claims, 3 Drawing Sheets

TOUCH SENSITIVE DISPLAY AND MANUFACTURING METHOD THEREOF

BACKGROUND OF THE INVENTION

This Application claims the benefit of the People's Republic of China Application No. 201110160546.X, filed Jun. 15, 2011.

FIELD OF THE INVENTION

The present invention relates to a display device, particularly relates to an organic light-emitting display that integrates with touch function.

DESCRIPTION OF THE RELATED ART

In recent years, with the rapid development of technology, flat panel displays and touch panels have been widely accepted and used in the world, and respectively replaced the traditional image output devices (e.g. CRT display) and physical keystroke devices (e.g.: keyboard, mouse).

Although the liquid crystal display (LCD) is presently the most widely used flat panel display device, many problems existing on the characteristic of liquid crystal display have a negative effect on the practical application of the liquid crystal display. Thus, manufactures have started putting efforts on the exploration of organic light-emitting displays (OLEDs). There is no backlight source in the organic light-emitting display, which mainly consists of an organic material coating layer and a glass substrate, and the organic materials will emit light once an electric current passes through it. The organic light-emitting display has many advantages compared to the liquid crystal display, such as being light-weight, having a wide viewing angle, and having a bendable screen.

Moreover, an OLED can also be combined with touch technology. FIG. 1 is a schematic section view of a traditional OLED touch sensitive display. As shown in FIG. 1, device 10 is mainly built up of the OLED structure to attain the display function. The OLED stricture comprises a lower substrate 130, an upper cover 110, an OLED device 120, and a sealing layer 150; wherein the OLED device 120 is stacked on the lower substrate 130, while the upper cover 110 is further disposed on the OLED device 120 and composed as a whole with the lower substrate 130 by the media of the sealing layer 150. To provide with the touch function of the device 10 simultaneously, a capacitive touch sensing layer 100 comprising a first transparent conducting layer 101, an isolating layer 102, and a second transparent conducting layer 103 has been formed on the upper cover 110.

The similar technology is also disclosed in a US published Patent (Publication No.: US2010/0110041), referring to FIG. 2, which is a schematic section view of another traditional OLED touch sensitive display. In order to make the OLED touch sensitive display 20, that is shown in FIG. 2, simultaneously have the touch function, a touch sensing multilayer structure is additionally formed on an upper cover 300 of the OLED touch sensitive display 20. The touch sensing multilayer structure includes a first conducting layer 310 and a second conducting layer 320 for conducting the touch sensing ability; besides, the touch sensing multilayer structure also has other elements, such as a first isolating layer 330, a second isolating layer 340, a second direction sensing electrode 312a, and a first conducting assembly 311b. These elements are all disclosed in the US published Patent (Publication No.: US2010/0110041) and will not be specifically described again here.

In general, the above-mentioned touch sensing structure has multiple layers, which are independently and separately formed from the OLED elements inside the OLED device. That traditional technology leads to an additional manufacturing procedure when the touch sensing structure needs to be formed on an OLED device, and that disadvantage also affects the manufacturing yield rate. Therefore, it is necessary to design an OLED touch sensitive display to overcome the defects of the traditional structure.

SUMMARY OF THE INVENTION

In view of foregoing, one object of the present invention is to merge layers to solve the above technical problems, so as to reduce the manufacturing procedure and efficiently increase the yield rate of the products.

In order to accomplish the above object, the present invention provides a touch sensitive display, which comprises a merged layer that is made of sensing electrodes and organic light-emitting electrodes. The touch sensitive display further comprises a first touch sensing layer and an organic light-emitting assembly. Wherein the first touch sensing layer has a plurality of first sensing electrodes which are formed on a surface of an upper substrate, the organic light-emitting assembly is disposed on a lower substrate, the merged layer is formed on the surface of said organic light-emitting assembly, and the sensing electrodes that comprised in the merged layer are second sensing electrodes; while the organic light-emitting electrodes are counter electrodes which originally belong to the organic light-emitting assembly.

In a preferable embodiment, the first touch sensing layer is formed on the upper surface of the upper substrate, and the merged layer is formed below the lower surface of the upper substrate, as the top layer of the upper surface of the lower substrate.

In another preferable embodiment, the first touch sensing layer is formed on the lower surface of the upper substrate, and the merged layer is formed below the first touch sensing layer as the top layer of the upper surface of the lower substrate.

In order to accomplish the above objective, the present invention further provides a manufacturing method of a touch sensitive display, which comprises a step of mixing or organizing sensing electrodes and organic light-emitting electrodes to form a merged layer. Furthermore, the manufacturing method comprises steps of forming a first touch sensing layer on a surface of an upper substrate. Wherein the first touch sensing layer comprises a plurality of first sensing electrodes; forming an organic light-emitting assembly on an upper surface of a lower substrate; forming the merged layer on the surface of the organic light-emitting assembly, wherein the sensing electrodes that comprised in the merged layer are second sensing electrodes, while the organic light-emitting electrodes are counter electrodes that originally belong to the organic light-emitting assembly; and forming the upper substrate and the lower substrate as an assembly.

DETAILED DESCRIPTION OF THE EMBODIMENTS

The detailed description of the present invention will be discussed in the following embodiments, which are not intended to limit the scope of the present invention, but still can be adapted for other applications. While drawings are illustrated in detail, it is appreciated that the quantity of the disclosed components would be greater or less than that is disclosed, except the components expressly restricting amount. Terms such as "above"/"below" and "upper"/"lower" in this specification are used to represent top-bottom relative directions. With respect to the figures accompanying this description, tops and bottoms of the depicted touch sensitive displays appear nearer to and further from the viewer respectively.

The present invention integrates a touch sensing layer with a special design into an organic light-emitting display (hereinafter abbreviated as OLED) to make the integrated touch sensitive display provide both image output and touch input functions, and that the special design will also reduce the manufacturing procedure and efficiently increase the yield rate of the touch sensitive display. The OLED provided by the present invention may be an active matrix OLED (namely AM-OLED) or a passive matrix OLED (namely PM-OLED) on the basis of driving method, and the pixel pattern of the OLED can also be arranged with different structures according to the practical design, which is not restricted by the present invention.

Figure 1:
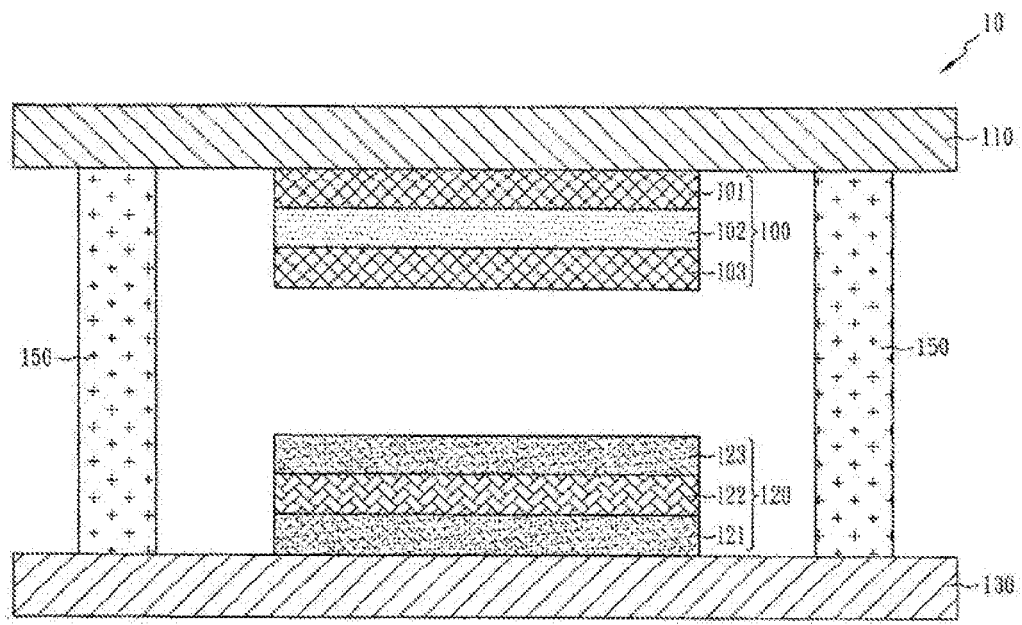
FIG. 1 is a schematic section view of a traditional OLED touch sensitive display.
Figure 2:
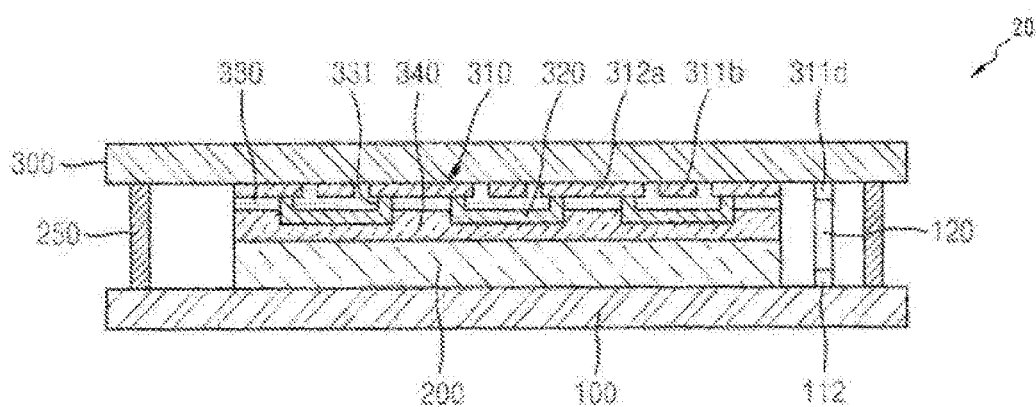
FIG. 2 is a schematic section View of another traditional OLED touch sensitive display.
Figure 3:
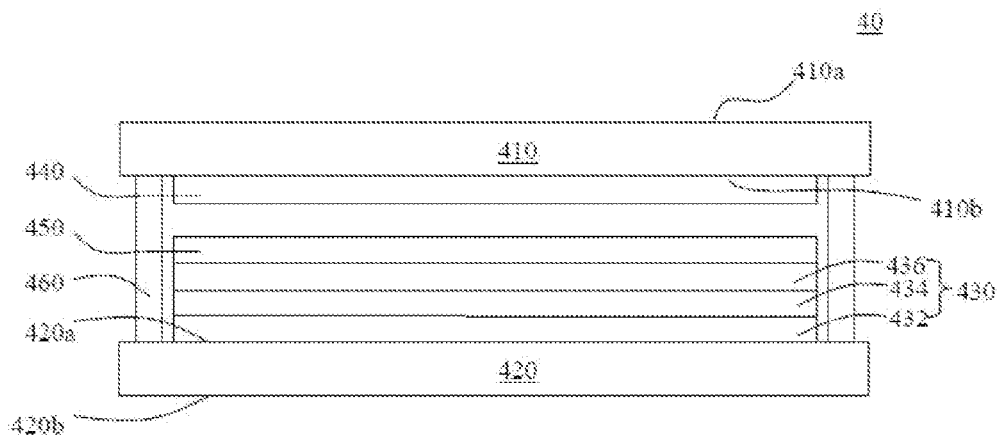
FIG. 3 is a schematic section view of a touch sensitive display in accordance with a preferable embodiment of the present invention.

FIG. 3 is a schematic section view of a touch sensitive display in accordance with a preferable embodiment of the present invention. As shown in FIG. 3, a touch sensitive display 40 is provided which comprises an upper substrate 410, a lower substrate 420, an organic light-emitting assembly 430, a first touch sensing layer 440, and a merged layer 450. The lower substrate 420 is formed below the upper substrate 410. More specifically, the upper substrate 410 further comprises an upper surface 410a and a lower surface 410b; the lower substrate 420 further comprises an upper surface 420a and a lower surface 420b, wherein the lower surface 410b of the upper substrate 410 and the upper surface 420a of the lower substrate 420 are oppositely formed. Moreover, the materials of the upper substrate 410 and the lower substrate 420 are respectively designed with glass, plastic, or the like.

The organic light-emitting assembly 430 is disposed on the lower substrate 420. More specifically, the organic light-emitting assembly 430 is disposed on the upper surface 420a of the lower substrate 420. In the present embodiment, the organic light-emitting assembly 430 comprises at least a thin-film transistor (TFT) assembly 432, a pixel electrode layer 434, and an intermediate layer 436, which are integrally formed on the lower substrate 420, are especially integrally formed on the upper surface 420a of the lower substrate 420 in a bottom-up sequence. Besides, the intermediate layer 436 comprises an electron injecting layer, an electron transfer layer, an organic light-emitting layer, a hole transfer layer, and a hole injecting layer. For increasing the operating efficiency of the intermediate layer 436, it is possible to add or lessen elements into, or from the intermediate layer 436; for example, adding a hole barrier layer between the organic light-emitting layer and electron transfer layer. In order to simplify the figure, those elements that are comprised in the intermediate layer 436 are all not shown in the figure. However, for the aspect of material, the pixel electrode layer 434 is made from the transparent conducting materials, e.g. tin indium oxide (ITO), the organic light-emitting layer can be designed to be spontaneously emit the white, red-green-blue three colors, or blue emitted lights based on the materials chosen for the organic light-emitting layer.

The first touch sensing layer 440 is disposed under the upper substrate 410. More specifically, the first touch sensing layer 440 comprises a plurality of first sensing electrodes which are formed on the lower surface 410b of the upper substrate 410. The merged layer 450 is formed on the surface of the organic light-emitting assembly 430, specifically, the merged layer 450 can be formed on the surface of the intermediate 436 of the organic light-emitting assembly 430 below the first touch sensing layer 440. In another preferable embodiment, the merged layer 450 is formed below the lower surface 410 of the upper substrate 410, as the top layer of the upper surface 420a of the lower substrate 420. The merged layer 450 is made of sensing electrodes and organic light-emitting electrodes, wherein the sensing electrodes that comprised in the merged layer 450 are second sensing electrodes, and the organic light-emitting electrodes that comprised in merged layer 450 are the counter electrodes, which originally belong to the organic light-emitting assembly 430. As the counter electrodes can be metal electrodes (e.g.: silver, magnesium or calcium), the second sensing electrodes also can be made from the metal oxide electrodes, the counter electrodes and the second sensing electrodes can be mixed or organized to form the merged layer 450. Therefore, it is not necessary to form a multilayer structure of pure touch assembly into the OLED, such that it can reduce the manufacture procedure and efficiently increase the manufacturing yield rate of the products with the reformed design.

In the present embodiment, the first sensing layer 440 is comprised of the plurality of first sensing electrodes, and the touch positions of the first sensing electrodes are different from that of the second sensing electrodes; the first sensing electrodes detect a first-axis direction (e.g. X-axis direction) of touch position, and the second electrodes detect a second-axis direction (e.g. Y-axis direction) of touch position.

The touch sensitive display 40 further comprises a sealing layer 460 that is formed in the peripheral area of the upper substrate 410 and the lower substrate 420, such that the upper substrate 410 and the lower substrate 420 are oppositely formed by gluing.

Figure 4:
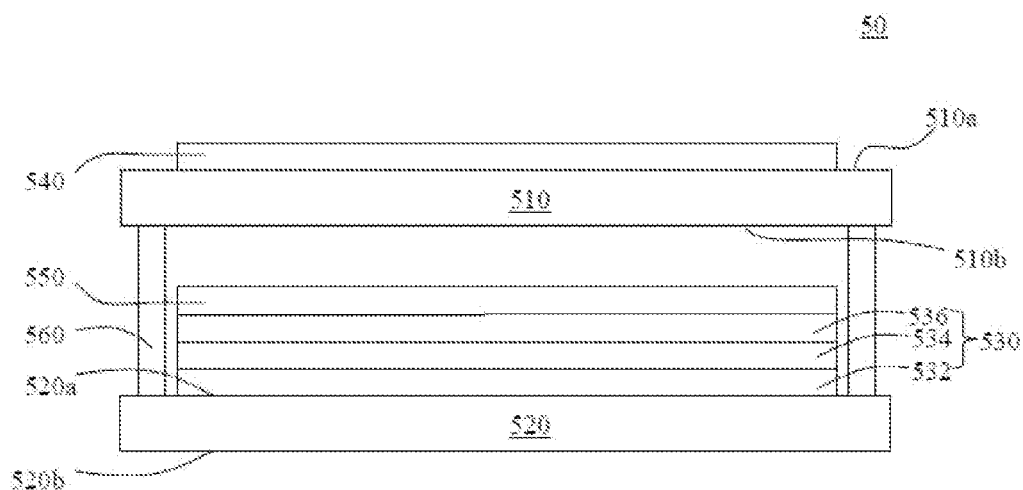
FIG. 4 is a schematic section view of a touch sensitive display in accordance with another preferable embodiment of the present invention.

FIG. 4, is a schematic section view of a touch sensitive display in accordance with another preferable embodiment of the present invention. The present embodiment provides a touch sensitive display 50, which comprises an upper substrate 510, a lower substrate 520, an organic light-emitting assembly 530, a first touch sensing layer 540, and a merged layer 550. The lower substrate 520 is formed below to the upper substrate 510. More specifically, the upper substrate 510 further comprises an upper surface 510a and a lower surface 510b, and the lower substrate 520 further comprises an upper surface 520a and a lower surface 520b, wherein the lower surface 510b of the upper substrate 510 and the upper surface 520a of the lower substrate 520 are oppositely formed. In the present embodiment, the organic light-emitting assembly 530 comprises at least a thin-film transistor element 532, a pixel electrode layer 534, and an intermediate layer 536, which are integrally formed on the lower substrate 520, and are especially integrally formed on the upper surface 520a of the lower substrate 520 in a bottom-up sequence. The touch sensitive display 50 further comprises a sealing layer 560 that is formed in the peripheral area of the upper substrate 510 and the lower substrate 520 to make the upper substrate 510 and the lower substrate 520 are oppositely formed by gluing.

The characteristics, materials, and the connection relationship of the elements mentioned in the present embodiment are similar to the foregoing embodiment. The differences therebetween are that the first touch sensing layer 540 in FIG. 4, composed by a plurality of first sensing electrodes, is formed on the upper surface 510a of the upper substrate 510, and the merged layer 550 is formed below the lower surface 510b of the upper substrate 510, and is placed as the top layer of the upper surface 520a of the lower substrate 520. The merged layer 550 is made of sensing electrodes and organic light-emitting electrodes. The sensing electrodes that comprised in the merged layer 550 are second sensing electrodes, and the organic light-emitting electrodes that comprised in the merged layer 550 are the counter electrodes that originally belong to the organic light-emitting assembly 530. Furthermore, because the first touch sensing layer 540 is formed on the upper surface 510a of the upper substrate 510, a protective layer (not shown) can also be formed on the upper substrate 510 for avoiding the destruction by any outside force.

Figure 5:
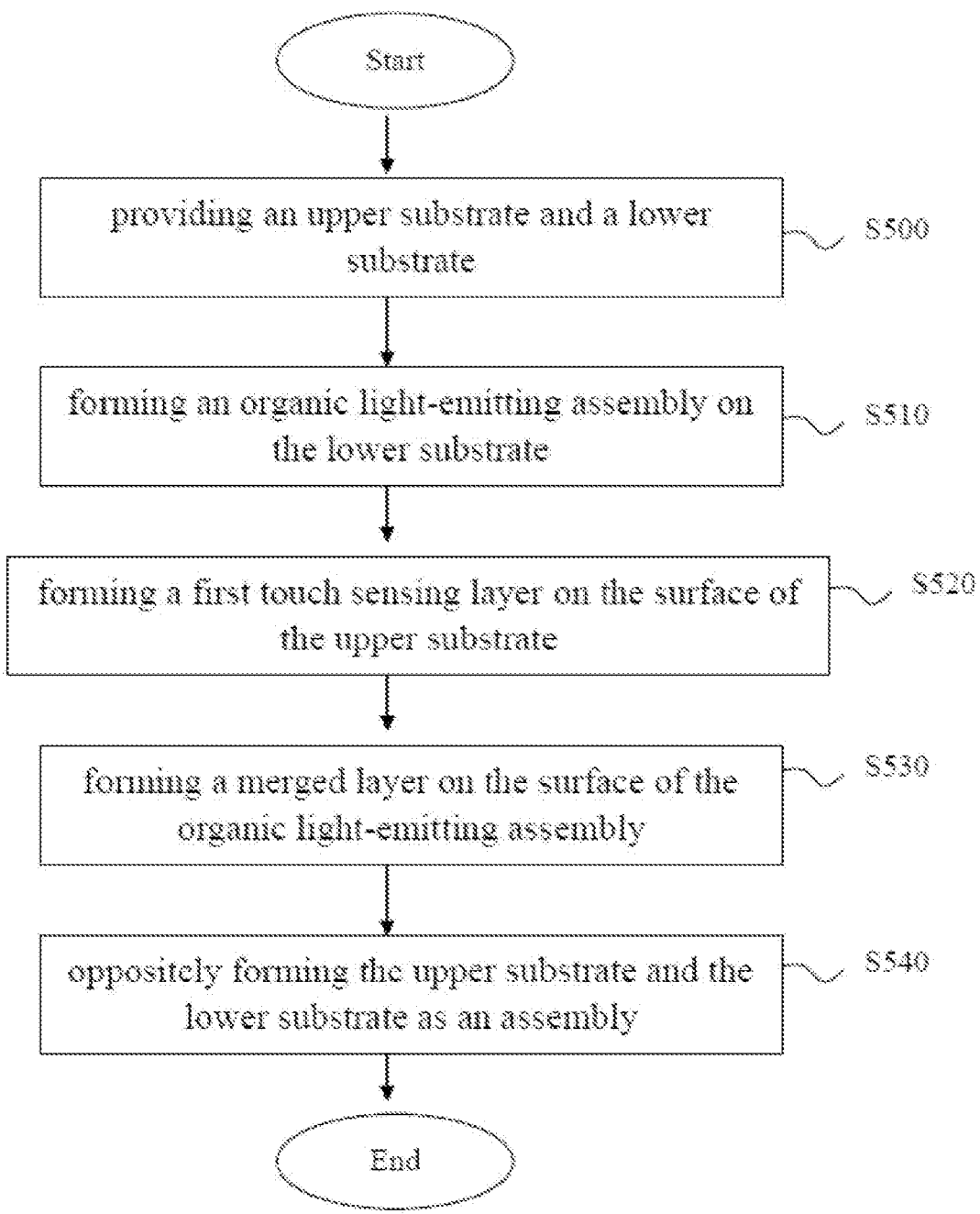
FIG. 5 is a flow chart of a touch sensitive display in accordance with a preferable embodiment of the present invention.

Referring to FIG. 5, a flow chart of a touch sensitive display, in accordance with a preferable embodiment of the present invention, is illustrated by the following steps:

Step S500: providing an upper substrate and a lower substrate;

Step S510: forming an organic light-emitting assembly on the lower substrate;

Step S520: forming a first touch sensing layer, which comprises a plurality of first sensing electrodes on the surface of the upper substrate, wherein the sequencing of the step S510 and S520 can be exchanged without affecting the complement of the embodiment;

Step S530: forming a merged layer on the surface of the organic light-emitting assembly. The merged layer is made of sensing electrodes and organic light-emitting electrodes, wherein the sensing electrodes that comprised in the merged layer are second sensing electrodes, and the organic light-emitting electrodes that comprised in the merged layer are the counter electrodes that originally belong to the organic light-emitting assembly; and Step S540: oppositely forming the upper substrate and the lower substrate as an assembly.

In particular, either the upper substrate or the lower substrate further comprises an upper surface and a lower surface. The lower surface of the upper substrate and the upper surface of the lower substrate are oppositely formed. Therefore, the organic light-emitting assembly is further formed on the upper surface of the lower substrate in the step S510, and the first touch sensing layer is formed on the upper or lower surface of the upper substrate in the step S520; if the first touch sensing layer is formed on the lower surface of the upper substrate, the merged layer is formed below the first touch sensing layer as the top layer of the upper surface of the lower substrate; if the first touch sensing layer is formed on the upper surface of the upper substrate, the merged layer is formed below the lower surface of the upper substrate as the top layer of the upper surface of the lower substrate.

In another preferable embodiment, the organic light-emitting assembly at least comprises a thin-film transistor element, a pixel electrode layer, and an intermediate layer, which can be integrally formed on the lower substrate in the step S510, and can especially be integrally formed on the upper surface of the lower substrate in a bottom-up sequence.

For the step S540, the specified way is to form a sealing layer between the upper substrate and the lower substrate, so as to oppositely form the upper substrate and the lower substrate as an assembly by gluing.

The materials and detailed structure regarding to the elements, are all disclosed in the foregoing embodiment and hence will not be described here.

The present invention integrates the second sensing electrodes, which originally belong to the second touch sensing layer, and the counter electrodes, which originally belong to the counter electrode layer of the organic light-emitting assembly, into one layer. Also, the first and the second sensing electrodes are respectively formed in the first touch sensing layer and the merged layer, wherein it is not necessary to form an additional isolating layer between the first touch sensing layer and the second touch sensing layer to avoid an electronic connection therebetween. Thereby, the present invention could reduce the whole manufacturing procedure and efficiently increase the manufacturing yield rate of the products.

All the above-mentioned are the description and figures for the particular embodiment of the present invention only; they are not being used for restricting the present invention. The scope of the present invention should be based on the claims, it is apparent to those skilled in the art that a variety of modifications and changes may be made without departing from the scope of the present invention, which is intended to be defined by the appended claims.

What is claimed is:

1. A touch sensitive display, comprising:
   a touch sensing assembly comprising a sensing electrode; and
   an organic light-emitting assembly below the touch sensing assembly, the organic light-emitting assembly comprising an organic light-emitting electrode and an intermediate layer disposed below the organic light-emitting electrode, wherein the intermediate layer comprises an organic light-emitting layer;
   wherein the sensing electrode and the organic light-emitting electrode are integrated into a merged layer, and a material of the sensing electrode is different from a material of the organic light-emitting electrode.

2. The touch sensitive display according to claim 1, wherein the material of the sensing electrode is metal oxide, and the material of the organic light-emitting electrode is metal.

3. The touch sensitive display according to claim 1, wherein the touch sensing assembly further comprises:
   a first touch sensing layer having a plurality of first sensing electrodes and formed on a surface of an upper substrate, the organic light-emitting assembly disposed on a lower substrate;
   wherein the merged layer is formed on the surface of the organic light-emitting assembly, the sensing electrode comprised in the merged layer comprises a plurality of second sensing electrodes, the organic light-emitting electrode comprised in the merged layer is a counter electrode of the organic light-emitting assembly.

4. The touch sensitive display according to claim 3, wherein the first touch sensing layer is formed on the upper surface of the upper substrate, and the merged layer is formed below the lower surface of the upper substrate as the top layer of the upper surface of the lower substrate.

5. The touch sensitive display according to claim 3, wherein the first touch sensing layer is formed on the lower surface of the upper substrate, and the merged layer is formed below the first touch sensing layer as the top layer of the upper surface of the lower substrate.

6. The touch sensitive display according to claim 3, further comprising a sealing layer formed in the peripheral area of the upper substrate and the lower substrate to make the upper substrate and the lower substrate oppositely formed as an assembly.

7. The touch sensitive display according to claim 3, wherein the organic light-emitting assembly further comprises at least a thin-film transistor element and a pixel electrode layer, which are integrally formed on the upper surface of the lower substrate.

8. The touch sensitive display according to claim 7, wherein the intermediate layer further comprises an electron injecting layer, an electron transfer layer, a hole transfer layer, and a hole injecting layer.

9. A method for manufacturing a touch sensitive display, comprising:
    forming a touch sensing assembly, the touch assembly at least comprising a sensing electrode;
    forming an organic light-emitting assembly under the touch sensing assembly, the organic light-emitting assembly at least comprising an organic light-emitting electrode and an intermediate layer disposed below the organic light-emitting electrode, wherein the intermediate layer comprises an organic light-emitting layer; and
    forming a merged layer by mixing a sensing electrode and the organic light-emitting electrode, wherein a material of the sensing electrode is different from a material of the organic light-emitting electrode.

10. The method for manufacturing the touch sensitive display according to claim 9, wherein the material of the sensing electrode is metal oxide, and the material of the organic light-emitting electrode is metal.

11. The method for manufacturing the touch sensitive display according to claim 9, further comprising:
    forming a first touch sensing layer on a surface of an upper substrate, wherein the first touch sensing layer comprises a plurality of first sensing electrodes;
    forming the organic light-emitting assembly on an upper surface of a lower substrate;
    forming the merged layer on the surface of the organic light-emitting assembly, wherein the sensing electrode comprised in the merged layer comprises a plurality of second sensing electrodes, while the organic light-emitting electrode is a counter electrode of the organic light-emitting assembly, wherein the touch sensing assembly comprises the first sensing layer and the second sensing layer; and
    forming the upper substrate and the lower substrate as an assembly.

12. The method for manufacturing the touch sensitive display according to claim 11, further comprising:
    forming the first touch sensing layer on an upper surface of the upper substrate, and the merged layer being formed below the lower surface of the upper substrate as the top layer of the upper surface of the lower substrate.

13. The method for manufacturing the touch sensitive display according to claim 11, further comprising:
    forming the first touch sensing layer on the lower surface of the upper substrate, and the merged layer being formed below the first touch sensing layer as the top layer of the upper surface of the lower substrate.

14. The method for manufacturing the touch sensitive display according to claim 11, further comprising:
    forming a sealing layer in the peripheral area between the upper substrate and the lower substrate to make the upper substrate and the lower substrate be oppositely formed as an assembly.

15. The method for manufacturing the touch sensitive display according to claim 11, wherein the organic light-emitting assembly further comprises a thin-film transistor assembly and a pixel electrode layer, which are integrally formed on the upper surface of the lower substrate.

16. The method for manufacturing the touch sensitive display according to claim 15, wherein the intermediate layer further comprises an electron injecting layer, an electron transfer layer, a hole transfer layer, and a hole injecting layer.

17. A touch sensitive display, comprising:
    a first touch sensing layer having a plurality of first sensing electrodes;
    a second touch sensing layer having a plurality of second sensing electrodes, the second touch sensing layer being formed below the first touch sensing layer; and
    an organic light-emitting assembly below the first touch sensing layer, the organic light-emitting assembly comprising an counter electrode, a pixel electrode layer and an intermediate layer therebetween, the intermediate layer comprising an organic light-emitting layer and being disposed below the counter electrode, the pixel electrode layer being disposed below the organic light-emitting electrode;
    wherein the second sensing electrode and the counter electrode are integrated into a merged layer, and a material of the second sensing electrode is different from a material of the counter electrode.

18. The touch sensitive display according to claim 17, wherein the first touch sensing layer is formed on a surface of an upper substrate, the organic light-emitting assembly disposed on a lower substrate;
    wherein the merged layer is formed on the surface of the organic light-emitting assembly.

19. The touch sensitive display according to claim 17, wherein the first touch sensing layer is formed on an upper surface of an upper substrate, and the merged layer is formed below an lower surface of the upper substrate as the top layer of the upper surface of the lower substrate.

20. The touch sensitive display according to claim 17, wherein the first touch sensing layer is formed on the lower surface of the upper substrate, and the merged layer is formed below the first touch sensing layer as the top layer of the upper surface of the lower substrate.

* * * * *